Feb. 22, 1938.    J. R. JOHNSON ET AL    2,108,821
MACHINE TOOL
Filed Oct. 3, 1934    5 Sheets-Sheet 1
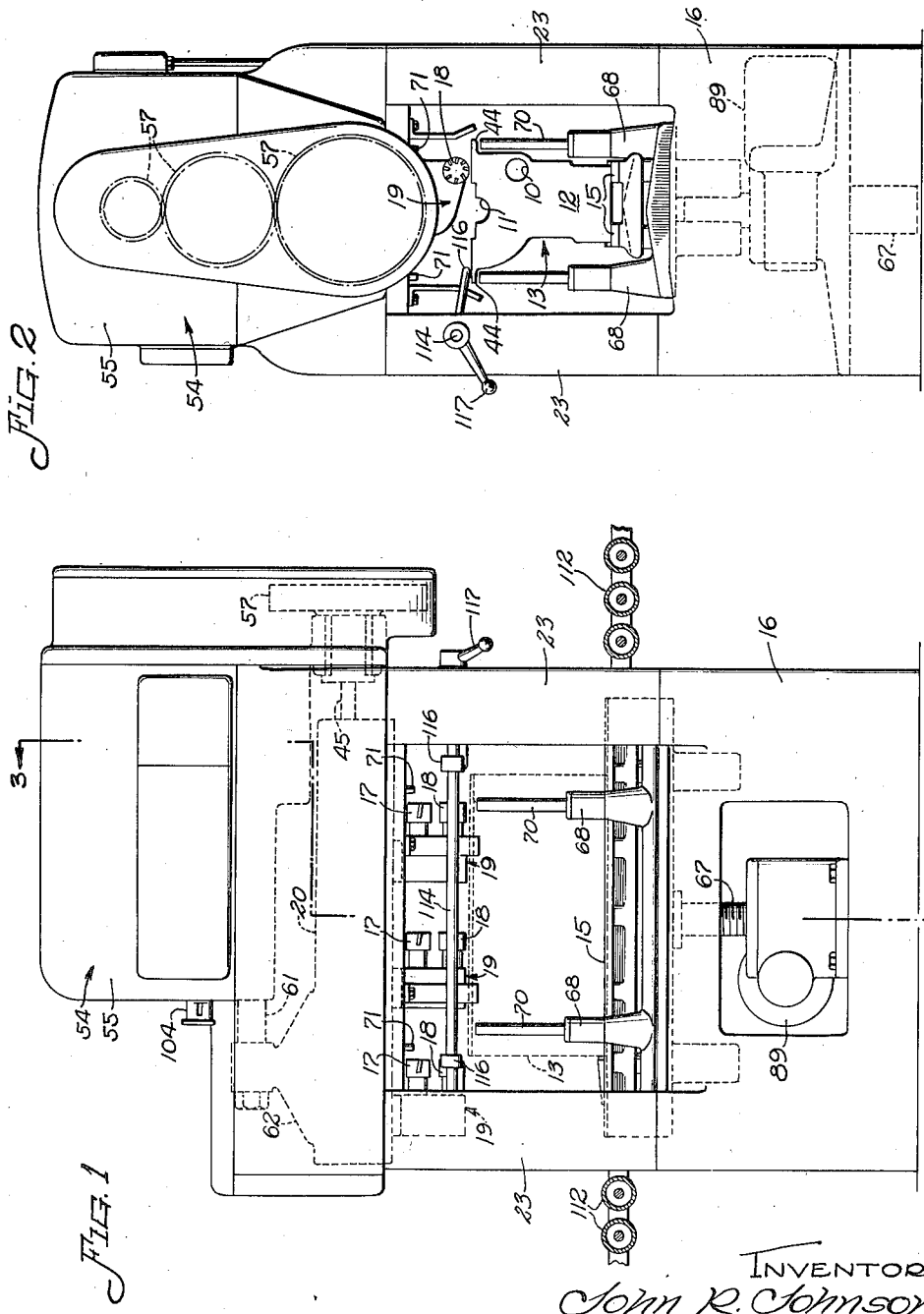

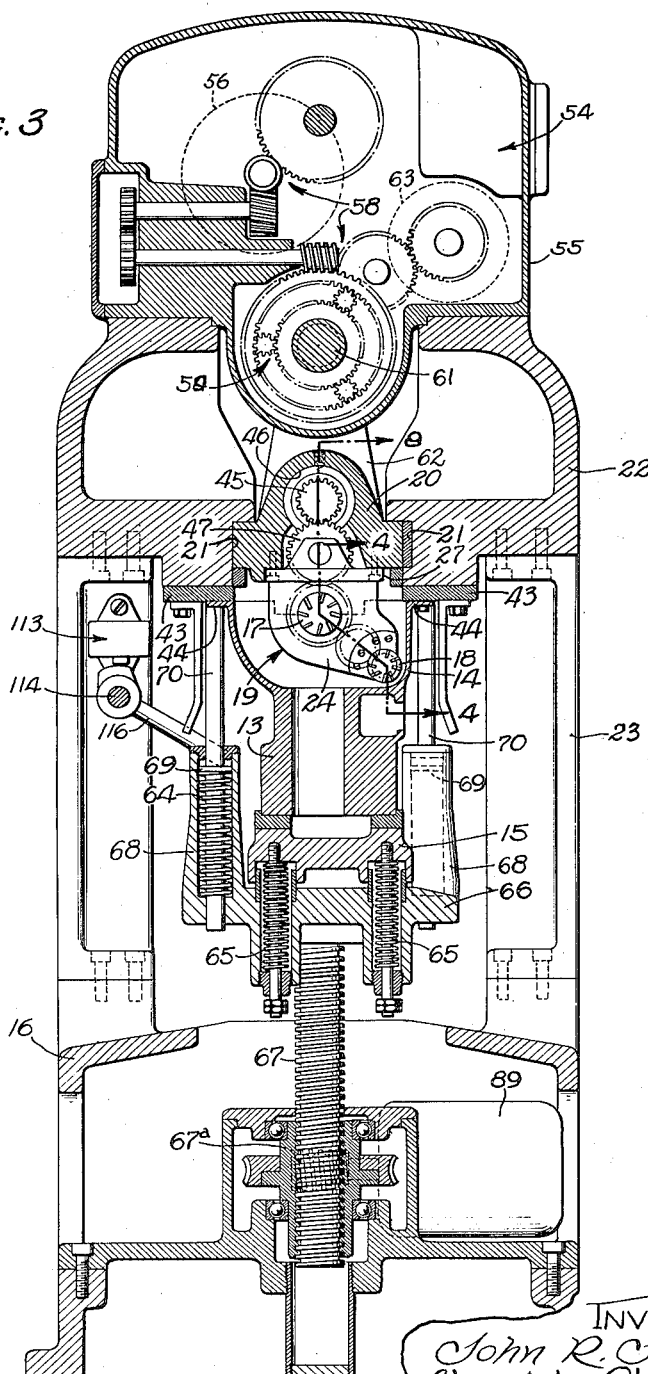

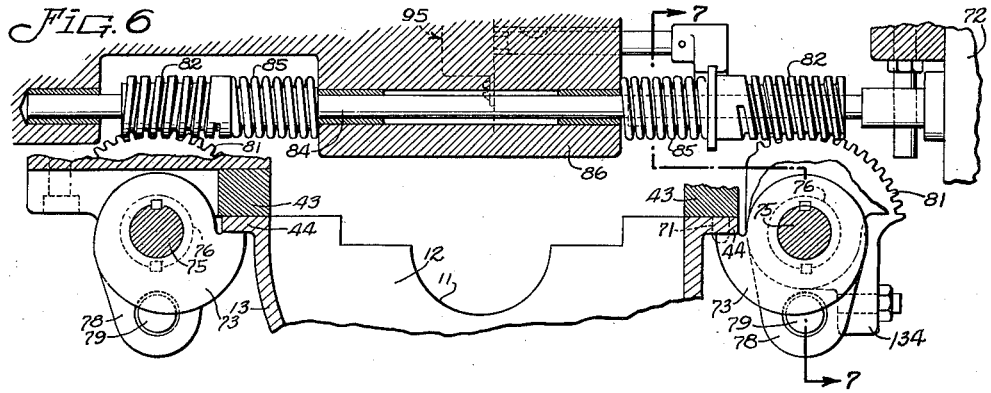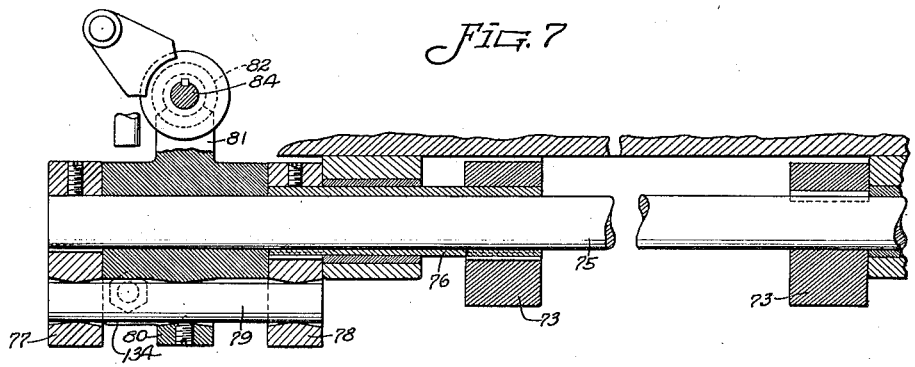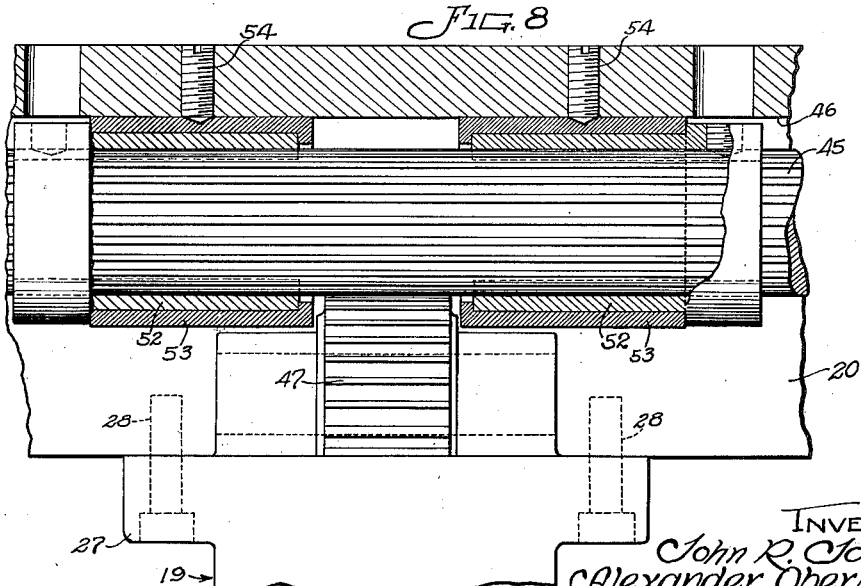

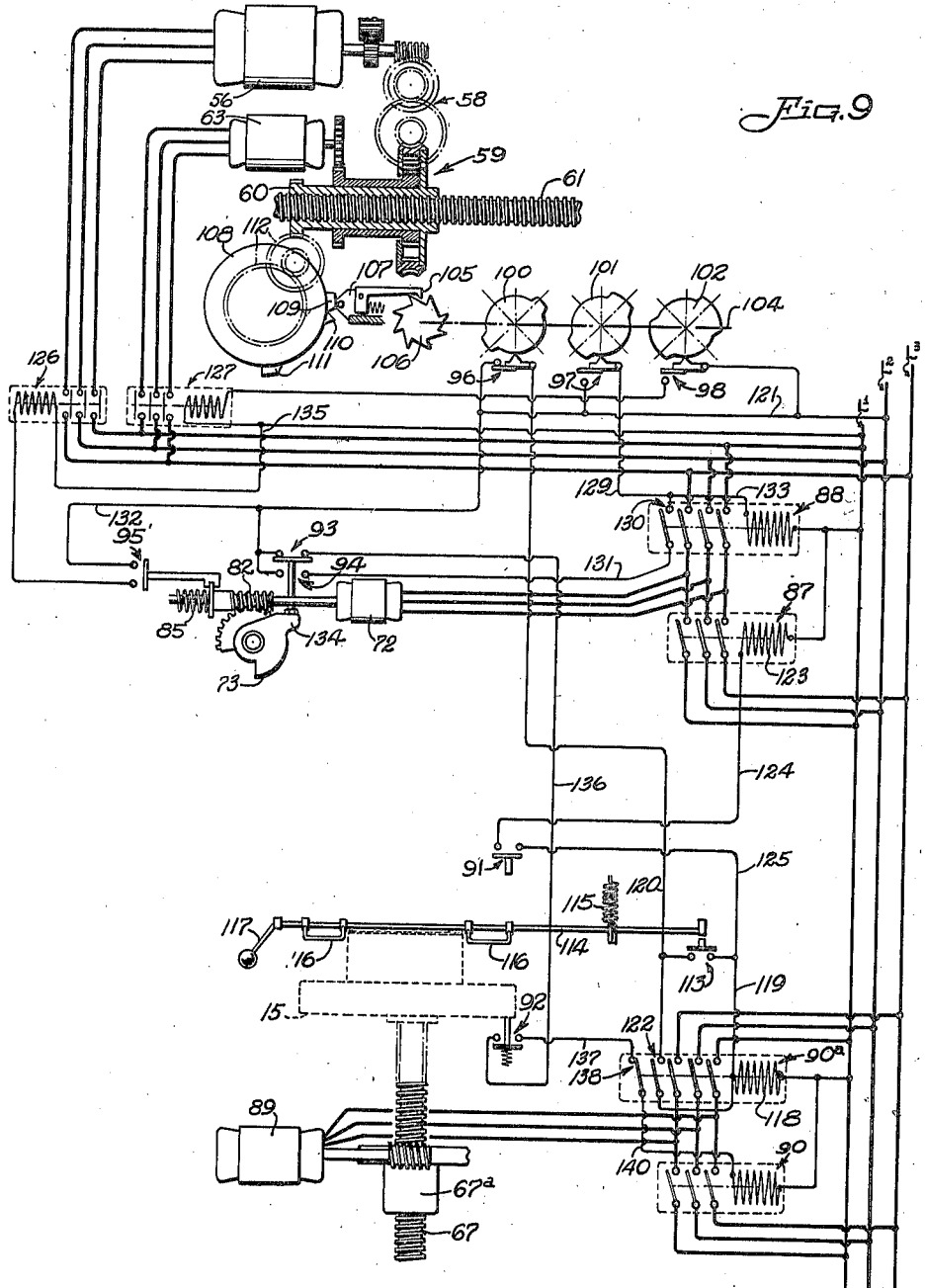

Patented Feb. 22, 1938

2,108,821

UNITED STATES PATENT OFFICE 2,108,821

MACHINE TOOL

John R. Johnson, Alexander Oberhoffken, and Ralph L. Cotta, Rockford, Ill., assignors to The Ingersoll Milling Machine Company, Rockford, Ill., a corporation of Illinois Application October 3, 1934, Serial No. 746,652

5 Claims. (Cl. 77—3)

This invention relates generally to machines for performing boring, reaming, and allied metal-removing processes and more particularly to the machining of the crank and cam shaft bearing recesses of internal combustion engine blocks.

One object of the invention is to provide a machine for the above purpose having a novel mounting of the tools which enables the machine to be changed over readily and adapted, without material alterations in construction, to changes in the positions of bearing recesses in the block.

Another object is to provide a novel tool mounting in a machine of the above character for supporting the cam shaft tools with the desired rigidity in spite of the location of the cam shaft recesses closely adjacent one side wall of the block.

A further object is to provide a new and improved means for driving the tools and feeding the same relative to the work in a crank and cam shaft boring machine of the type in which the tools are carried by projections mounted on a common support and enter the open end of the crank case.

In the machine tools heretofore used for machining the bearing recesses in engine blocks, the block is ordinarily held in working position by clamping members applied to the top and bottom surfaces of the block. It has been found in practice that the clamping pressure required produces such distortion of the block that the holes formed while the block is subjected to the clamping action are not truly circular. Therefore, another object of the present invention is to provide a novel means for clamping an engine block in working position without distorting that position of the block in which the recesses are to be formed.

The invention also resides in the novel character of the mechanism for supporting and clamping of the work.

It is also an object of the invention to provide a novel means for disabling the clamping means until the block has been properly positioned.

Other objects and advantages of the invention will become apparent from the following detailed description taken in connection with the accompanying drawings, in which Figure 1 is a side elevational view of a boring machine embodying the novel features of the present invention.

Figure 2 is an end elevation.

Figure 3 is a vertical section taken along the line 3—3 of Figure 1.

Figure 6 is a fragmentary sectional view similar to Figure 3, of a modified form of means for clamping the work piece.

Figure 7 is a sectional view taken along the line 7—7 of Figure 6.

Figure 8 is a fragmentary section taken along the line 8—8 of Figure 3.

Figure 9 is a schematic view and wiring diagram of the work clamping and tool driving and feeding mechanism.

Figure 4:
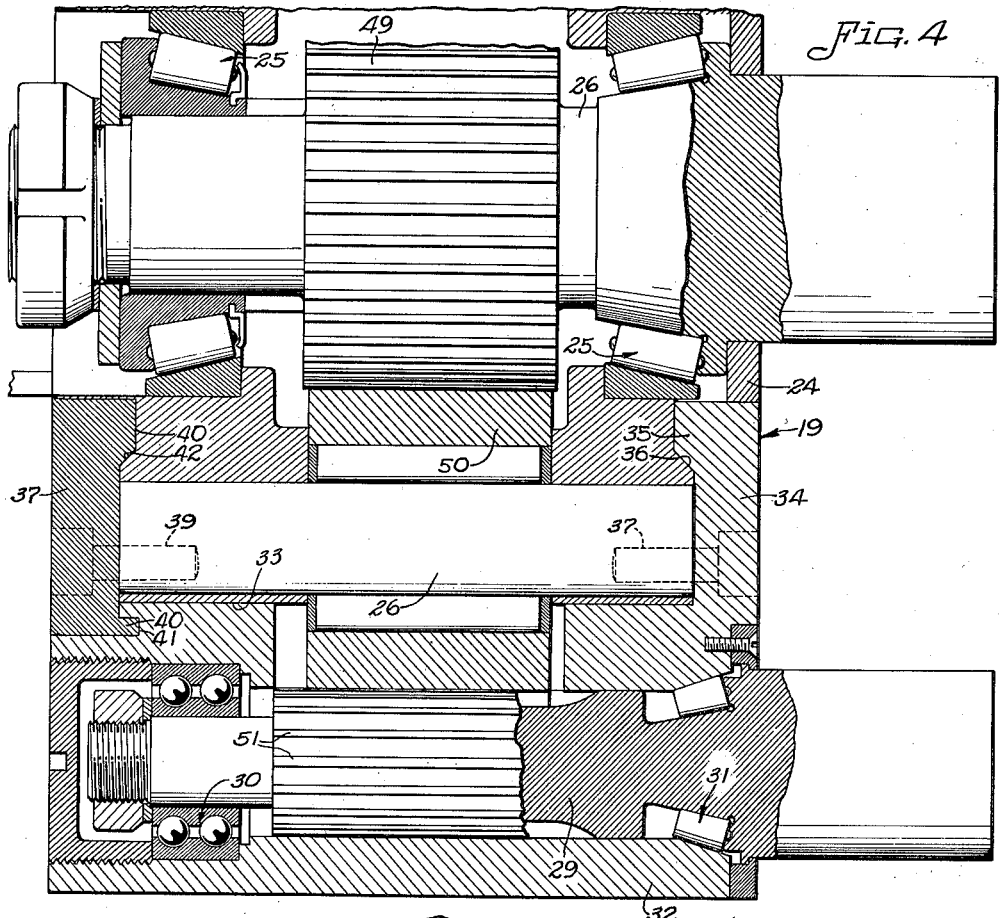
Figure 4 is a fragmentary vertical sectional view taken along the line 4—4 of Figure 3.

While the invention is susceptible of various modifications and alternative constructions, we have shown in the drawings and will herein describe in detail the preferred embodiment, but it is to be understood that we do not thereby intend to limit the invention to the specific form disclosed, but intend to cover all modifications and alternative constructions falling within the spirit and scope of the invention as expressed in the appended claims.

In the exemplary form shown in the drawings, the invention is embodied in a machine tool arranged to bore or ream simultaneously the cam shaft holes 10 and the half bearing recesses 11 in the end walls and crosswebs 12 of an internal combustion engine block 13. The cam shaft holes are in this instance located closely adjacent a side wall 14 of the crank case.

Preferably, the block while being operated upon is supported in inverted position upon a table or platen 15 mounted for vertical movement on a base structure 16 of the machine. The recesses of each web 12 are, in the present instance machined by a pair of cylindrical cutters 17 and 18 rotatably secured to and projecting downwardly from an elongated support or carriage 20. The arms 19 are spaced to correspond to the spacing of the holes to be bored, so as to enter the intervening openings in the crank case as the block is raised to working position.

The carriage 20 is of rigid construction and supported at opposite side edges by spaced horizontal ways 21 in a frame super-structure 22 which is rigidly supported above the block by four posts 23 upstanding from the corners of the base 16. The carriage is thus adapted for endwise reciprocation parallel to the axes of the recesses to be bored so that after the block has been raised to position the cutters 17 and 18, all of the holes will be bored simultaneously as the carriage is fed forwardly.

In order to render the machine readily adaptable to changes in the spacing of the bearings of the engine block, the saddles 19 for the different pairs of tools are made as separate detachable units adapted to be mounted in various positions along the carriage 20. Herein, each saddle comprises a housing 24, which supports anti-friction bearings 25 in which are journaled the opposite ends of the spindle 26 carrying the crank bearing boring cutter 17 on its projecting end. At its upper end, the housing 24 has a flange 27 which may be secured as by means of bolts 28 in any desired position along the underside of the carriage 20 as determined by the position of the bearing web to be bored by the tools on the saddle.

Figure 5:
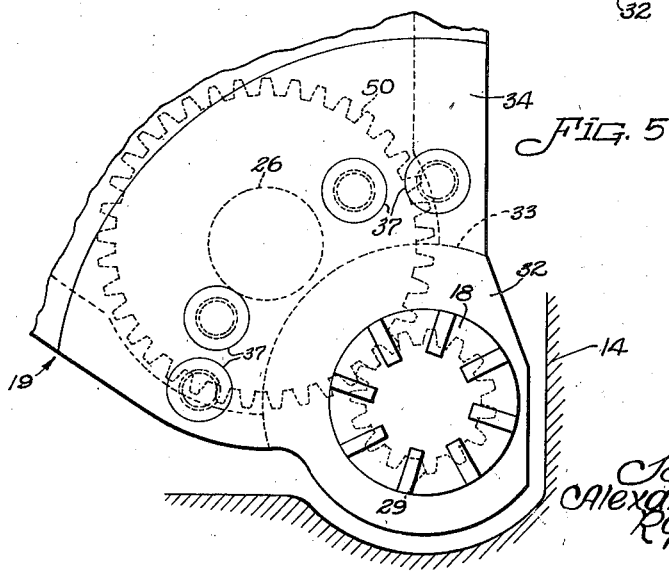
Figure 5 is an elevational view looking from the left in Figure 4.

The cutter 18 for boring the cam shaft recess is fast on a spindle 29 which is journaled in anti-friction bearings 30 and 31 on a separately formed part 32 which is detachably secured to the lower end of the saddle housing 24. The part 32 is of generally tubular construction and fits accurately in an arcuate seat 33 (Fig. 5) formed at the lower end of the housing 24. At one end of the tube is an integral right angular arm 34 (Figs. 4 and 5) of segmental shape which abuts against one side of the saddle proper and has an inturned flange 35 clamped in an arcuate groove at 36 by means of screws 37. The opposite end of the tube is held in place by a separate plate 37 clamped by a series of screws 39 against the other side of the saddle housing and having flanges 40 which seat in arcuate grooves 41 and 42 respectively formed in the end of the tube 32 and the saddle housing 24.

By virtue of the separate mounting provided for the bearings of the spindle 29, it will be apparent that this mounting may, by proper selection of materials, be made of the strength required to provide proper lateral support for the spindle in spite of the narrow space allowable between the cam shaft axis and the adjacent inner wall of the engine block. To enable the strength of the spindle mounting to be further increased, the anti-friction elements 31 run in raceways integral respectively with the spindle 29 and the tube 32. The separate bearing support is also advantageous in that changes in the location of the cam shaft recesses may be accommodated merely by substituting different members 32 having the spindles 29 properly located therein.

It will be understood that the overall dimension of the saddle unit and the cutters thereon measured in the direction of the cutter axes is less than the distance between the adjacent bearing webs 12 by an amount greater than the axial lengths of the bearings to be bored. Thus, with the saddles 19 properly spaced along the carriage 20 to correspond to the spacing of the webs 12, the tools will be brought into proper boring position in alinement with the rough recesses to be bored as an incident to upward movement of the inverted engine block against the under side of clamping ledges 43 on the super structure 22 as shown in Fig. 3. Of course, the axes of the cutters 17 and 18 are exactly spaced relative to each other and to the ledges 43 to correspond to the relative spacing of the crank and cam shafts and the surface of the crank case flange 44 in the finished block. With the block thus positioned, the bearing recesses will be machined simply by feeding the carriage 20 endwise with the tools rotating.

The cutters 17 and 18 on all of the saddles preferably are rotated from a common shaft 45 disposed externally of the block during the boring operation and having permanent gear connections with the cutters on the respective saddles. To facilitate changing the spacing of the saddles 19, the shaft 45 extends axially of a channel 46 formed in and extending longitudinally of the carriage 20 and defined by a cylindrical surface which is interrupted at the lower side to form an opening through which power may be taken from the shaft at any point along its length. As shown in Fig. 8 the shaft is formed throughout its length with gear teeth meshing at spaced points with spur gears 47 mounted on the saddle housings adjacent the point of attachment to the carriage 20.

The gear 47 drives a gear 49 on the spindle 26 and in turn driving a gear 50 which meshes with teeth 51 cut directly on the spindle 29 intermediate the supporting bearings 30 and 31 thereof so as to minimize the diameter of the latter without materially reducing its strength. All of the gears are supported through the medium of anti-friction bearings on shafts which have their opposite ends supported in opposite sides of the saddle 19.

The drive shaft 45 is rotatably supported at opposite ends in bearings not shown, and to provide bearing supports for the shaft adjacent each point of power take-off, internally toothed collars 52 meshing with the gear teeth on the shaft are journaled in bearing bushings 53 fitting snugly within the channel 46 and held in place by set screws 54. Since the bushings may be adjusted longitudinally along the channel 46 and the collars may be positioned at any point along the spline shaft 45, it will be apparent that the shaft bearings may without material alteration in the construction, be shifted readily to accommodate changes in the spacing of the points of power take-off.

As a means for driving the shaft 45 and for feeding the carriage 20 back and forth, a self-contained power unit 54 is mounted at the top of frame super-structure 22. This unit comprises briefly a casing 55 constituting a housing for a combined tool drive and feed motor 56 (Fig. 9) the shaft of which drives the shaft 45 through the medium of a train of gears 57, (Fig. 2) the terminal one of which is splined on the shaft 45. The motor operates through the medium of a separate worm and spur gear train 57 (Figs. 3 and 10) to drive one terminal element of a differential gearing 59 having its intermediate element fast on a nut 60 rotatably mounted in the casing 55 and threaded onto a screw 61. The latter is held against rotation and one end thereof is secured to a lug 62 on the carriage 20. It will be apparent that operation of the motor 56 will produce corresponding feeding movement of the carriage 20. Preferably the tools are retracted out of the work at a rapid traverse rate, this being accomplished by operation of a motor 63 arranged to drive the other terminal member of the differential gearing 59.

Heretofore, it has been the general practice in boring the crank and cam shaft recesses in engine blocks to apply a heavy pressure to the cylinder end of the block for the purpose of clamping the crank case flange 44 against a locating plate. It has been found that the block is so distorted under such clamping pressure as to prevent the formation of truly circular bearing recesses. To obviate this difficulty, the present invention contemplates the application of the clamping pressure to a different part of the block, preferably directly to the crank case flange 44. In the form shown in Figs. 1 to 3, this clamping pressure is applied by heavy compression springs 64 which come into play as the block approaches its final working position in the upward movement of the supporting platen 15. For this purpose, the platen 15 is supported through the medium of relatively light compression springs 65, (Fig. 3) from a plate 66 which is guided by means not shown for vertical movement and supported on the upper end of a screw 67 threading into a nut 67ª rotatably mounted on the base 16. Rigid with and upstanding from the corners of the plate 66 are tubular standards 68 housing the springs 64 which act between the plate 66 and shoulders 69 on rods 70, the latter being guided in the standards with their upper ends positioned for engagement with the flange 44 on the block.

In the normal starting position, the rods 70 are disposed below the flange 44 as shown in Fig. 2, the weight of the block being sustained by the springs 65. During the initial upward movement of the plate 66, dowel pins 71, on the locating plate 43 enter holes in the crank case flange 44, and the latter becomes located accurately. As the plate 66 continues to rise, the springs 65 yield permitting the rods 70 to engage the flange 44 after which the springs 64 become compressed to derive the desired clamping pressure. The lines of action of the clamping force exerted by the spring 64 pass through the flange 44 and outside the main body portion of the engine block 13 in which the metal removing operations are subsequently performed so that the block is undistorted by the clamping pressure.

In the preferred embodiment shown in Figs. 6, 7, and 8, the pressure for clamping the flanges 44 against the locating plate 43 is applied directly by an electric motor 72 acting through the medium of four or more clamping devices in the form of crank arms 73 engaging at spaced points along the flanges 44 and interconnected in a manner such as to exert substantially equal pressure on the flanges thereby compensating for variations in the flange thickness. To this end, a pair of the crank arms 73 acts on each flange 44, and these are rigid with a shaft 75 and sleeve 76 (Fig. 7) carrying two spaced crank arms 77 and 78 respectively. The latter are connected by a cross-pin 79 to a crank 80 loose on the shaft 75 which is supported from the frame structure 22 alongside one of the flanges 44.

As shown in Fig. 7, the cranks 77, 78, and 80 have point contact only with the pin 79 so that the latter is free to tilt about its point of engagement with the crank 80 and thereby act differentially to allow for some degree of relative angular movement between the cranks 73 of each pair. The pressure applied by the cranks on either side of the block is thus equalized.

Rigid with the cranks 80 are gear segments 81 meshing with worms 82 splined on the shaft 84 of the torque motor 72 and formed with right and left hand threads so that the clamping arms 73 will swing in unison into engagement with the flanges 44 when the motor rotates in one direction while a relay 87 is energized. Reverse rotation of the clamping motor occurs when the coil of a relay 88 is energized. Springs 85 acting in compression between the worms 82 and abutments 86 permit of continued rotation of the worms after the crank arms 72 have come to rest against the flanges 44. Thus, during clamping, the worms are free to shift axially of the shaft 84 against the action of the springs 85 resulting in equalization of the pressure between the clamping devices on opposite sides of the engine block.

When the separate motor driven clamp is employed, the platen 15 is, as shown in Fig. 9, carried directly on the upper end of the screw 67 which is arranged to be raised and lowered by rotation of the nut 67ª driven by a reversible torque motor 89. Relays 90 and 90ª control this motor, the platen being raised when the coil of the relay 90ª is energized and lowered when the relay 90 is energized.

In the machines illustrated in the drawings, the engine blocks to be operated upon are moved onto the platen 15 from a conveyor track 112, (Fig. 1) and are unloaded from the opposite side of the machine. To avoid damage to the machine such as might occur by raising the platen 15 before the block to be operated upon is correctly positioned and the preceding block moved out of the way, means is provided for preventing closure of the starting switch 113 (Fig. 9) until the block is correctly positioned. For this purpose, the switch 113 is arranged to be closed by rocking of a shaft 114 against the action of a spring 115. The shaft is mounted on the machine frame alongside the block to be machined and carries two feeler arms 116 movable toward the block on the platen 15 when a handle 117 is turned in a direction to close the switch 113. The arms 116 are so located that they will pass opposite ends of a block correctly positioned on the platen but will engage the block and prevent closure of the switch 113 in the event that the block is not in the correct position when the shaft is rocked.

Operation of the different motors to define an automatic cycle of operation of the machine in response to closure of the starting switch 113 is governed by switches 91 and 92 responsive to the movements of the work support 15, switches 93, 94, and 95 actuated by the clamping motor 72, and switches 96, 97, and 98 actuated in response to the movements of the tool carriage 20. As shown in Fig. 9, the switch 91 is normally open but is closed by the platen 15 when the latter reaches its uppermost position. The switch 92 is spring closed and held opened when the platen 15 is in its lowermost or loading position. Switches 93 and 94 are actuated by an extension 134 rigid with one of the clamping arms 80, the switches being respectively closed and open when the crank arms 73 are in inactive position as viewed in Fig. 9, and open and closed respectively in the clamping position (Fig. 6). The switch 95 is actuated by the axial movement of one of the clamping worms 82, being normally open but closed upon yielding of the spring 85 following engagement of the clamping arms 73 with the flanges 44.

The switches 96, 97, and 98 are arranged to be actuated by cams 100, 101, and 102 fast on a shaft 104 which is advanced with a step-by-step movement by reciprocation of a pawl 105 acting on a ratchet wheel 106 on the shaft. The pawl is carried by a reciprocable follower 107 positioned for engagement with the periphery of a cam disk 108 carrying dogs 109, 110, and 111 and driven in unison with the movements of the tool carriage 20 by a train of gears 112 driven from the nut 60.

*Operation*

The operation of the machine will now be described, it being assumed that the parts are in starting position as shown in Fig. 9 and that an engine block is correctly positioned on the platen 15. When the switch 113 is closed by swinging the starting handle 117 to active position, a circuit is completed from the power line L¹ through the relay coil 118, conductors 119 and 120, the then closed switch 96, conductor 121 to the power line L². Energization of the coil 118 closes the relay switch 90ª which starts the motor 89 in a direction to raise the platen 15, a maintaining circuit also being established through the relay switch 122 and the switch 96.

As the platen approaches its upper limit of travel, the switch 91 is closed completing a circuit from the power line L¹, the coil 123 of the relay 87, conductor 124, switch 91, conductor 125, maintaining switch 122, conductor 120, switch 96, conductor 121 to the line L². Closure of the relay switch 87 starts the motor 72 in a direction to swing the arms 73 into clamping engagement with the flanges 44. The motor 89 stalls when the block comes against the locating plates 43, the motor being of such low capacity that the clamping pressure exerted on the bottom of the block is not objectionable insofar as distortion of the block is concerned.

In the movement of the crank arms 73 to clamp the flanges 44, the switch 93 opens and the switch 94 is allowed to close. When the block has become firmly clamped against the plate 43 as evidenced by axially shifting of one of the worms 82 against the action of its spring 85, the switch 95 will be closed applying current to the coil of a relay 126 through a circuit extending from the line L², conductors 121 and 132, the switch 95, the coil of the relay 126, a conductor 135 to the line L². Energization of relay 126 starts the tool drive and feed motor 56 in a direction to advance the carriage 20 and thereby feed the boring tools 17 and 18 into the rough holes to be bored. As the follower 107 rides over the dog 110, the camshaft 104 is advanced one step without changing the position of any of the switches actuated thereby.

The extent of the tool feed is determined by a dog 111 on the cam disk 108. When this dog engages and actuates the plunger 107, the camshaft is advanced through its second step in which the cam 102 closes the switch 98 thereby energizing the relay 127. This starts the rapid traverse motor 63 in a direction to retract the tool carriage 20 thereby withdrawing the boring tools 17 and 18 from the bearing recesses in the block.

Near the completion of the rapid return motion, the dog 110 engages the follower 107 and causes the camshaft to be advanced in its third step during which the cam 100 opens the switch 96 which de-energizes the relay 90ª and the platen motor 89. Also in this motion, the cam 101 closes the switch 97 which completes a circuit for the coil of the relay 88 extending from the line L¹, the relay coil, a conductor 129, the switch 97, the conductor 121 to the line L². Energization of this relay starts the motor 72 in a direction to retract the clamping arms 73 and also establishes a maintaining circuit which extends from the line L¹, through the relay coil, a conductor 133, a switch 130 of the relay 88, a conductor 131, the then closed switch 94, conductors 132 and 121 to the line L².

In the initial operation of the motor 72, the worm 82 moves under the action of its spring 85, causing the switch 95 to be opened thereby interrupting the operation of the feed and tool drive motor 56. The motor 72 continues to operate until the crank arms 73 have been retracted to their idle position shown in Fig. 9, whereupon an arm 134 opens the switch 94 thereby de-energizing the relay 88 to stop the motor 72. The arm 134 also closes the switch 93 completing a circuit for energizing the coil of the relay 90 extending from the line L² through conductors 121 and 132, the switch 93, a conductor 136, the switch 92, a conductor 137, a then closed switch 138 of the relay 90ª, a conductor 140, the coil of the relay 90 to the line L¹. The motor 89 is thus started in a direction to lower the platen 15 and continues to operate until the switch 92 is opened in the approach of the platen to its lower or loading position. Opening of the switch 92 stops the motor thereby completing the cycle.

Prior to the starting of the motor 89 and after the tools 17 and 18 have been fully retracted out of the bracing recesses, the dog 109 on the cam disk 112 engages the plunger 107 causing the cam shaft 104 to be advanced in its fourth step. During this movement, the cam 102 is moved to allow the switch 98 to open thereby de-energizing the relay 127 and stopping the rapid return motor 63. Movement of the tool carriage in thus arrested with the tool saddles disposed between the bearing webs 12 of the engine block so that they may be retracted from the block by lowering of the platen 15.

Certain features of the control mechanism illustrated herein form the subject matter of Kampmeier application Serial No. 75,857, filed April 22, 1936, and no claim is made herein to such features.

We claim as our invention:

1. A machine tool for machining the bearing recesses of an engine block comprising, in combination, an abutment engageable with the crank case side of an engine block, a member engageable with the opposite side of said block and movable toward and away from the abutment to press said crank case side against the latter with a pressure insufficient to distort the block substantially, power actuated clamping means adapted to be rendered active after said block has approached said abutment and acting, when operated, to engage the crank case flange and clamp the block against said abutment with a pressure substantially greater than said first mentioned pressure but sufficient to hold the block firmly during machining of said recesses, and means for machining said recesses while the block is so clamped.

2. A machine tool for machining the bearing recesses of an engine block comprising, in combination, a downwardly facing abutment engageable with the crank case side of an engine block, power actuated clamping means engageable with the crank case flange of said block and movable toward said abutment to press said flange thereagainst with a pressure sufficient to hold the block firmly during machining of said recesses, a member below said abutment engageable with the side of said block opposite said crank case flange and movable upwardly to bring said flange to a position adjacent said abutment for engagement of said flange by said clamping means, and means for machining said recesses while the block is held against said abutment by said clamping means.

3. A machine tool for boring the bearing recesses of an engine block comprising, in combination, a downwardly facing abutment engageable with the crank case side of said engine block, a member supporting boring tools in positions to machine said recesses when said block is disposed against said abutment, a support beneath said abutment engageable with the side of said block opposite said flange to support the block in alinement with but below its final working position, power actuated mechanism for raising the block positioned on said support against said abutment including clamping members engageable with said crank case flange and operable thereon to urge said flange against said abutment with sufficient pressure to hold the block firmly during boring of said recesses and thereby avoid subjecting the bearings of the block to objectionable stresses, and means for effecting relative movement between the clamped block and said tool supporting member for boring said recesses.

4. A machine tool for boring the bearing recesses of an engine block comprising, in combination, a downwardly facing abutment engageable with the crank case side of said engine block, a member supporting boring tools in positions to machine said recesses when said block is disposed against said abutment, a support beneath said abutment engageable with the side of said block opposite said flange to support the block in alinement with but below its final working position, a plurality of independently operable clamping members movable toward said abutment and engageable with different parts of said crank case flange and operable to press the flange against said abutment with sufficient pressure to hold the block firmly during boring of said recesses without subjecting the bearing portions of said block to distorting stresses, a common source of clamping power, means for applying power from said source to said members to render each of the members effective in producing said clamping pressure irrespective of variations in the thickness of said flange at the points of engagement by the clamping members, and means for effecting relative movement between the clamped block and said tool supporting member to bore said recesses.

5. A machine tool for boring the bearing recesses in an engine block comprising, in combination, a downwardly facing abutment, a support for supporting a block below said abutment and movable vertically, power actuated means movable relative to said support and engageable with the crank case flange of the block to clamp the latter firmly against said abutment without distorting said recesses, a tool supporting member movable relative to the clamped work piece to bore said recesses, means movable automatically as an incident to movement of said block with said support to a position adjacent said abutment to initiate operation of said clamping means, and means automatically responsive to effective clamping of said block against said abutment by said clamping means to initiate advance of said tool supporting member.

JOHN R. JOHNSON.
ALEXANDER OBERHOFFKEN.
RALPH L. COTTA.